UNITED STATES PATENT OFFICE.

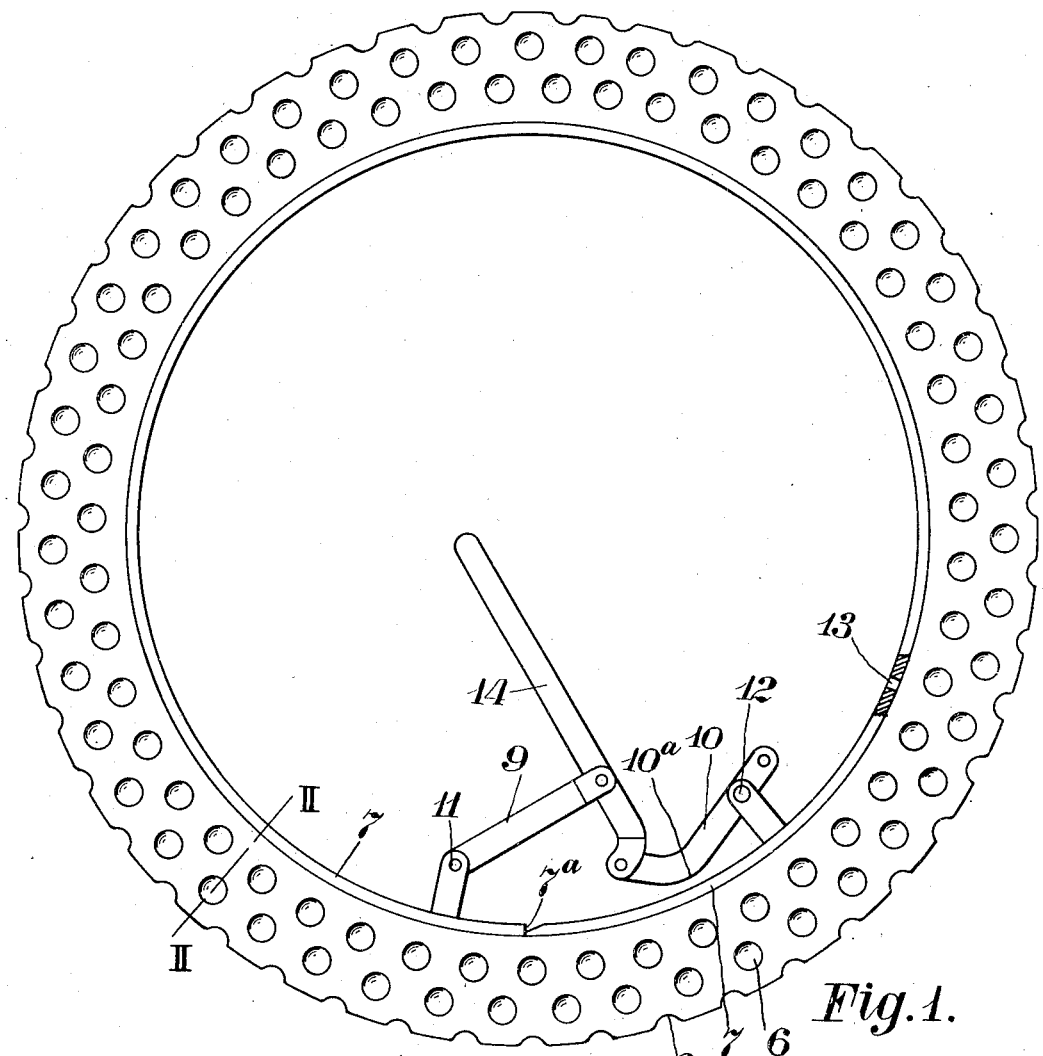
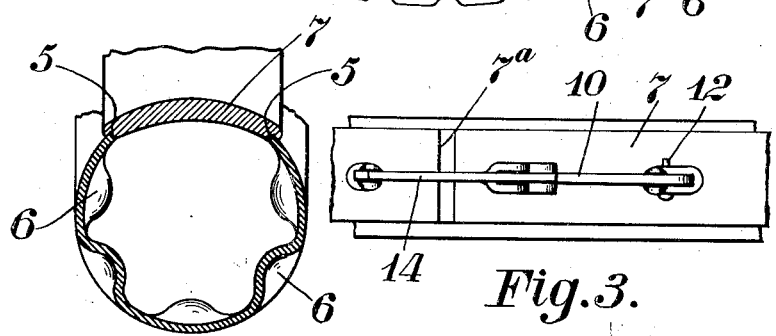

IRVING S. HOFFMANN, OF COLUMBUS, OHIO.

MOLD FOR TUBES AND TIRES.

1,378,678.  Specification of Letters Patent.  Patented May 17, 1921.

Application filed December 15, 1919. Serial No. 344,915.

*To all whom it may concern:*

Be it known that I, IRVING S. HOFFMANN, a citizen of the United States, residing at Columbus, in the county of Franklin and State of Ohio, have invented a certain new and useful Improvement in Molds for Tubes and Tires, of which the following is a specification.

Heretofore molds for vulcanizing pneumatic rubber tubes and tires have been made of cast metal and are consequently heavy, expensive and difficult to handle. The object of the present invention is to make such molds cheap, light in weight and easy to handle.

The invention is embodied in the example herein shown and described, the features of novelty being finally claimed.

In the accompanying drawing—

Figure 1 is a side view of the mold.

Fig. 2 is a cross section on, say, the line II—II Fig. 1, but on a larger scale.

Fig. 3 is a plan view of the means for operating the mold closure.

In practice I take a piece of ordinary straight metallic tubing of an internal diameter equal to the diameter of the tube or tire to be vulcanized and of a length sufficient to provide for the proper circumferential dimensions of the tube or tire to be vulcanized and bend it into circular form, the ends being cut and welded together so as to make a neat smooth joint. Then from the inner circumference I cut a strip of sufficient width to provide an ample opening 5 at the inner side of the mold for the insertion of the prepared tube or tire blank which is to be vulcanized. In the example shown the mold is provided with several series of rounded indentations forming projections 6 which impart to the molded tube corresponding superficial recesses. The recesses as shown herein can be formed by the use of a suitable tool under suitable pressure.

The inner circumferential opening 5 is covered with a divided contractible ring 7 cut at 7ª so that when the ring is sprung into place to cover the opening in the body of the mold the ends at the division fit closely together. This ring 7 should be made at its outer surface to blend with the inner surface of the mold, and the edges of the ring are rabbeted to fit neatly on the edges of the mold body so as to make a closed joint when in place. The ring is also provided with a suitable opening such as shown at 13 for the passage to the exterior of the nipple for inflating the tube to be vulcanized.

The means for springing the closing ring 7 into place consists, in the instance shown, of two links 9 and 10 pivoted at 11 and 12 respectively on the adjacent end portions of the ring, said links being connected by a hand lever 14 so that by moving said lever to the right (as shown in Fig. 1) the left hand end of the ring is drawn up to contract the ring and permit its lateral withdrawal from the mold body. It will be noted that in this operation the hump 10ª in the link 10 abuts against the ring 7 and, therefore, affords a support for the action of the hand lever. When the ring is to be expanded into position to close the mold the procedure is reversed, but in the final closing movement the pivot 12 acts as the purchase for the action of the lever.

In use the rubber tube to be vulcanized is inserted through the circumferential opening in the body of the mold and the cover applied. The tube is then inflated to conform to the interior of the mold and the structure subjected to the necessary vulcanizing heat.

The forms of the parts can be changed without departing from the gist of the invention as claimed.

What I claim is:

1. A vulcanizing mold member for rubber tubes consisting of a circular seamless unitary casing of metal circumferentially open at its inner side and provided with indentations to form the design to be imparted to the rubber tube and means for closing said circumferential opening.

2. A mold for vulcanizing a tube or tire comprising a hollow ring having an opening around its circumference and an expansible ring for closing said opening and means for actuating said expansible ring consisting of two links connected with the ring and a lever connecting the links, one of said links affording a fulcrum by contact with one end of the ring for the operation of the other link and other end of the ring.

3. A mold for vulcanizing a tube or tire comprising a hollow ring having an opening around its circumference and an expansible ring for closing said opening and means for actuating said expansible ring consisting of links connected with the ring and a lever connecting the links, substantially as described.

IRVING S. HOFFMANN.